United States Patent
Cole et al.

(10) Patent No.: US 6,564,232 B1
(45) Date of Patent: May 13, 2003

(54) METHOD AND APPARATUS FOR MANAGING DISTRIBUTION OF CHANGE-CONTROLLED DATA ITEMS IN A DISTRIBUTED DATA PROCESSING SYSTEM

(75) Inventors: Gary Philip Cole, Driftwood, TX (US); John Winans Pozdro, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/343,437

(22) Filed: Jun. 30, 1999

(51) Int. Cl.$^7$ .............................................. G06F 17/30
(52) U.S. Cl. ...................................... 707/203; 707/511
(58) Field of Search ............................ 707/3, 101, 102, 707/103, 200, 203, 511

(56) References Cited

U.S. PATENT DOCUMENTS 5,734,718 A * 3/1998 Prafullchandra ............ 713/183
6,240,184 B1 * 5/2001 Huynh et al. ................ 380/206

OTHER PUBLICATIONS

IBM Technical Disclosure Bulletin, vol. 34, No. 10A, Mar. 1992; Extendible Kernel Configuration Parameters For A UNIX Operating System; pp. 126–127.

IMB Technical Disclosure Bulletin, vol. 40, No. 03, Mar. 1997; Method For Enabling Software Updates Through The Internet.

* cited by examiner

*Primary Examiner*—Safet Metjahic
*Assistant Examiner*—Haythim Alaubaidi
(74) *Attorney, Agent, or Firm*—Duke W. Yee; Leslie A. VanLeeuwen

(57) ABSTRACT

A method and apparatus in a data processing system for managing distribution of data structures. A first data structure is received including a first version identifier. The version identifier is stored for the first data structure. A second structure is received including a second version identifier. Responsive to receiving a second data structure, a determination is made as to whether the second data structure is a replacement for the first data structure. Responsive to the second data structure being a replacement for the first data structure, a determination is made as to whether the first version identifier is different from the second version identifier. Responsive to a determination that the first version identifier is different from the second version identifier, the first data structure is replaced with the second data structure.

24 Claims, 14 Drawing Sheets

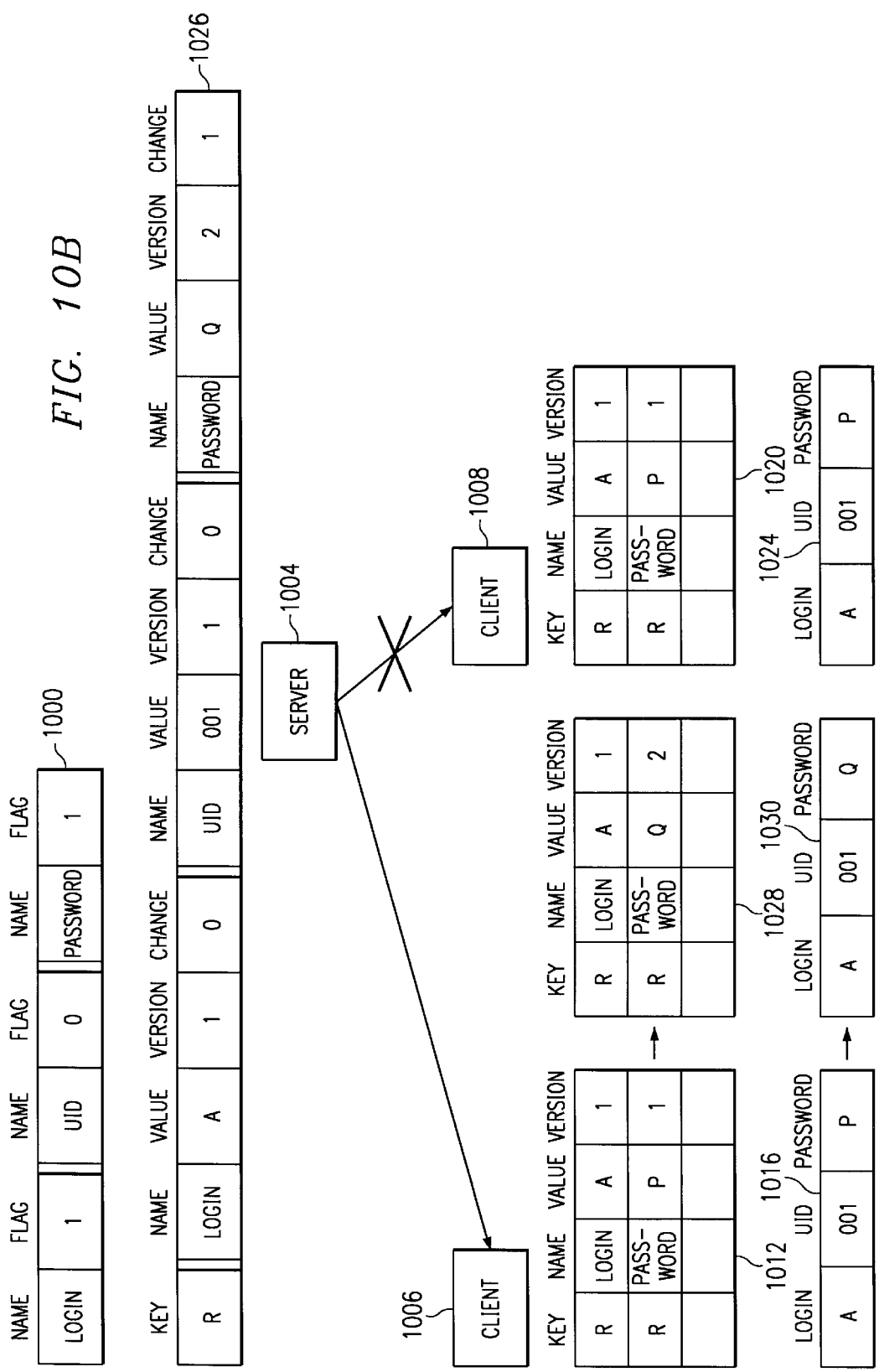

| NAME | FLAG | NAME | FLAG | NAME | FLAG |
|---|---|---|---|---|---|
| LOGIN | 1 | UID | 0 | PASSWORD | 1 |

1202:

| KEY | NAME | VALUE | VERSION | CHANGE | NAME | VALUE | VERSION | CHANGE | NAME | VALUE | VERSION | CHANGE |
|---|---|---|---|---|---|---|---|---|---|---|---|---|
| R | LOGIN | A | 1 | 0 | UID | 001 | 1 | 0 | PASSWORD | P | 1 | 0 |

1204 SERVER

1206 CLIENT

1212:

| KEY | NAME | VALUE | VERSION |
|---|---|---|---|
| R | LOGIN | A | 1 |
| R | PASS-WORD | P | 1 |

1216:

| LOGIN | UID | PASSWORD |
|---|---|---|
| A | 001 | P |

1208 CLIENT

1220:

| KEY | NAME | VALUE | VERSION |
|---|---|---|---|
| R | LOGIN | A | 1 |
| R | PASS-WORD | P | 1 |

1224:

| LOGIN | UID | PASSWORD |
|---|---|---|
| A | 001 | P |

1226:

| LOGIN | UID | PASSWORD |
|---|---|---|
| A | 200 | P |

METHOD AND APPARATUS FOR MANAGING DISTRIBUTION OF CHANGE-CONTROLLED DATA ITEMS IN A DISTRIBUTED DATA PROCESSING SYSTEM

BACKGROUND OF THE INVENTION

1. Technical Field

The present invention relates generally to an improved data processing system and in particular to a method and apparatus for distributing data items. Still more particularly the invention relates to a method and apparatus for distributing data items that are change-controlled.

2. Description of Related Art

In a distributed systems management environment, a central manager or server operates with many end points, also referred to as clients. A systems management profile is a set of data records resident on a server that are used to model instances of some entity being managed on its clients. A profile contains two types of data records: regular profile records and profile meta-records. Both types of records are comprised of profile record properties, which are data structures that model the name, type, and value of a data item on a client. Both types of records contain the same properties, but settings in regular profile records pertain to exactly one instance of a managed entity on a client, while settings in profile meta-records assist in the management of the profile's regular records. Examples of meta-records include the defaults record, which contains default values for certain properties of newly-created profile records, and the validation record, which defines restrictions for the values of certain properties with which all of the profile's regular records must comply.

In profile operations, a large number of data records may be passed from the server to the clients. While the server's version of a managed data item normally replaces the client's version, certain profile properties are change-controlled. Change control means that the server's value for a particular data item must not replace the client's unless certain conditions are met. One example of a change-controlled property is a password. The server and client vessions of an account's password are expected to diverge over time since the client operating system periodically requires its users to update their passwords, so a client's password must be replaced only when a system administrator has explicitly changed the server's version of the password.

Another example of a property requiring change control is a login. The server's version of the login cannot always replace the client's because there may not be sufficient information available to correctly identify the client account that is to have its login replaced; this will be the case if the server and client versions of the account's login don't match prior to the server's login change.

Yet another example of a change-controlled property is a UNIX user ID (UID). Properly controlling changes of a UNIX UID is a significant issue because some users or customers want all instances of a particular account to have the same UID, while other customers want to allow these instances to have various UIDs on various client machines.

Therefore, it would be advantageous to have an improved method and apparatus for managing distribution of change-controlled data items to clients.

SUMMARY OF THE INVENTION

The present invention provides a method and apparatus in a data processing system for managing distribution of data structures. A first data structure is received including a first version identifier. The version identifier is stored for the first data structure. A second structure is received including a second version identifier. Responsive to receiving a second data structure, a determination is made as to whether the second data structure is a replacement for the first data structure. Responsive to the second data structure being a replacement for the first data structure, a determination is made as to whether the first version identifier is different from the second version identifier. Responsive to a determination that the first version identifier is different from the second version identifier, the first data structure is replaced with the second data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 10A–10C are diagrams for updating a password change depicted in accordance with a preferred embodiment of the present invention;

FIGS. 12A–12D are diagrams for a user ID change depicted in accordance with a preferred embodiment of the present invention.

DETAILED DESCRIPTION OF THE PREFERRED EMBODIMENT

Figure 1:
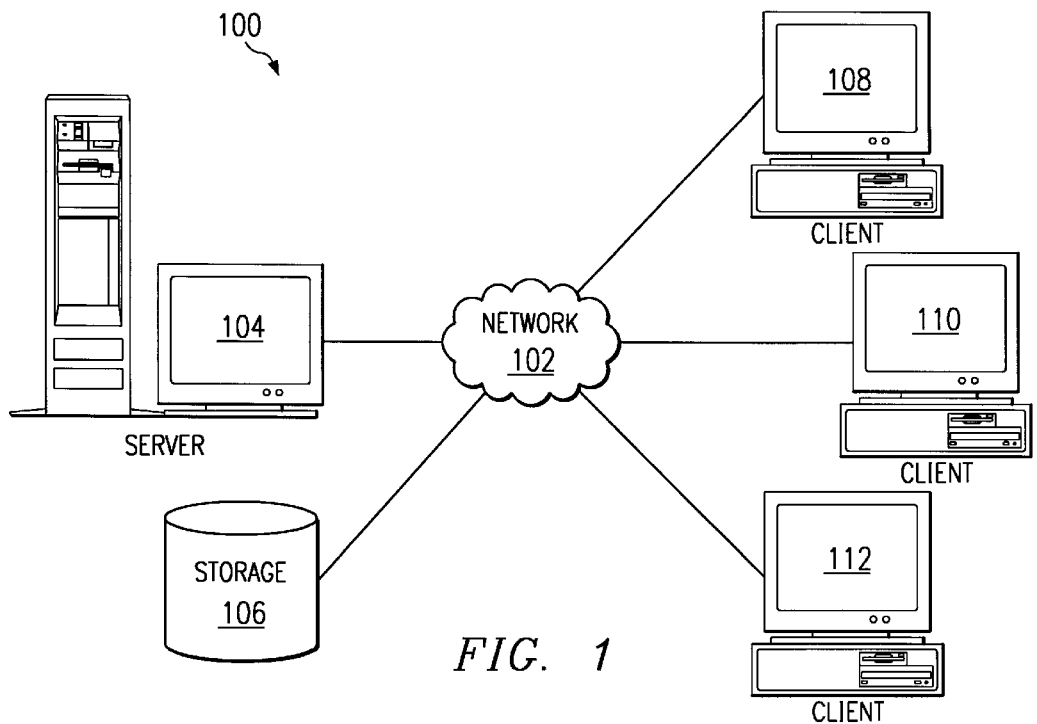
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
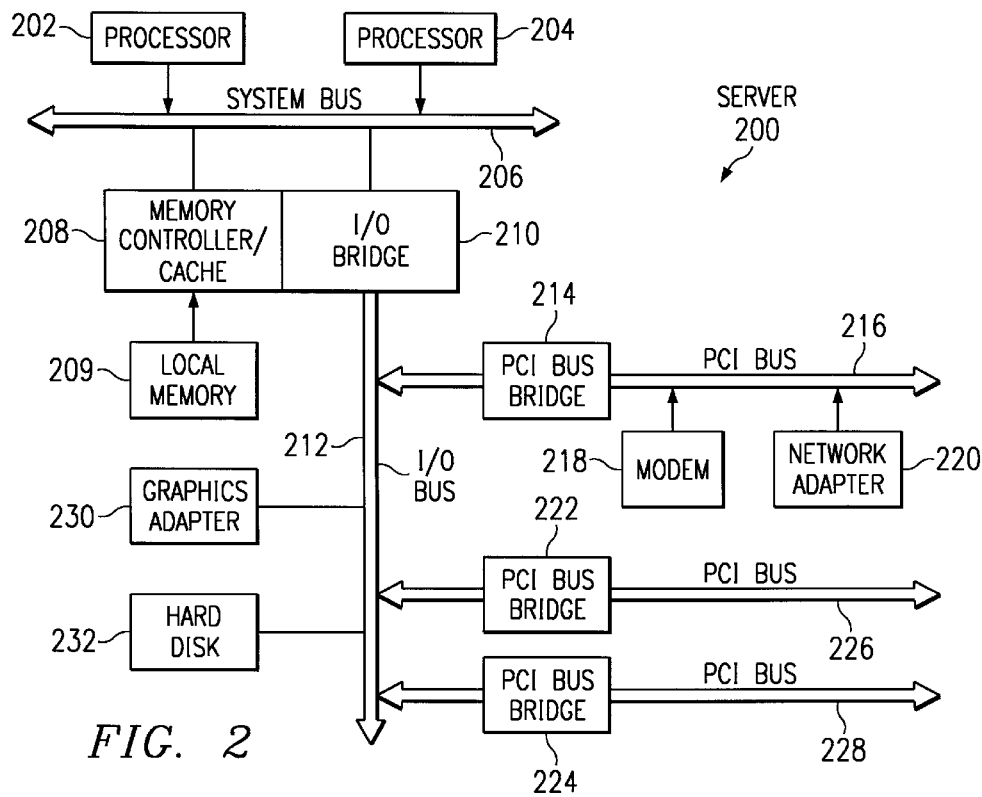
FIG. 2 is a block diagram of a data processing system that may be implemented as a server.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
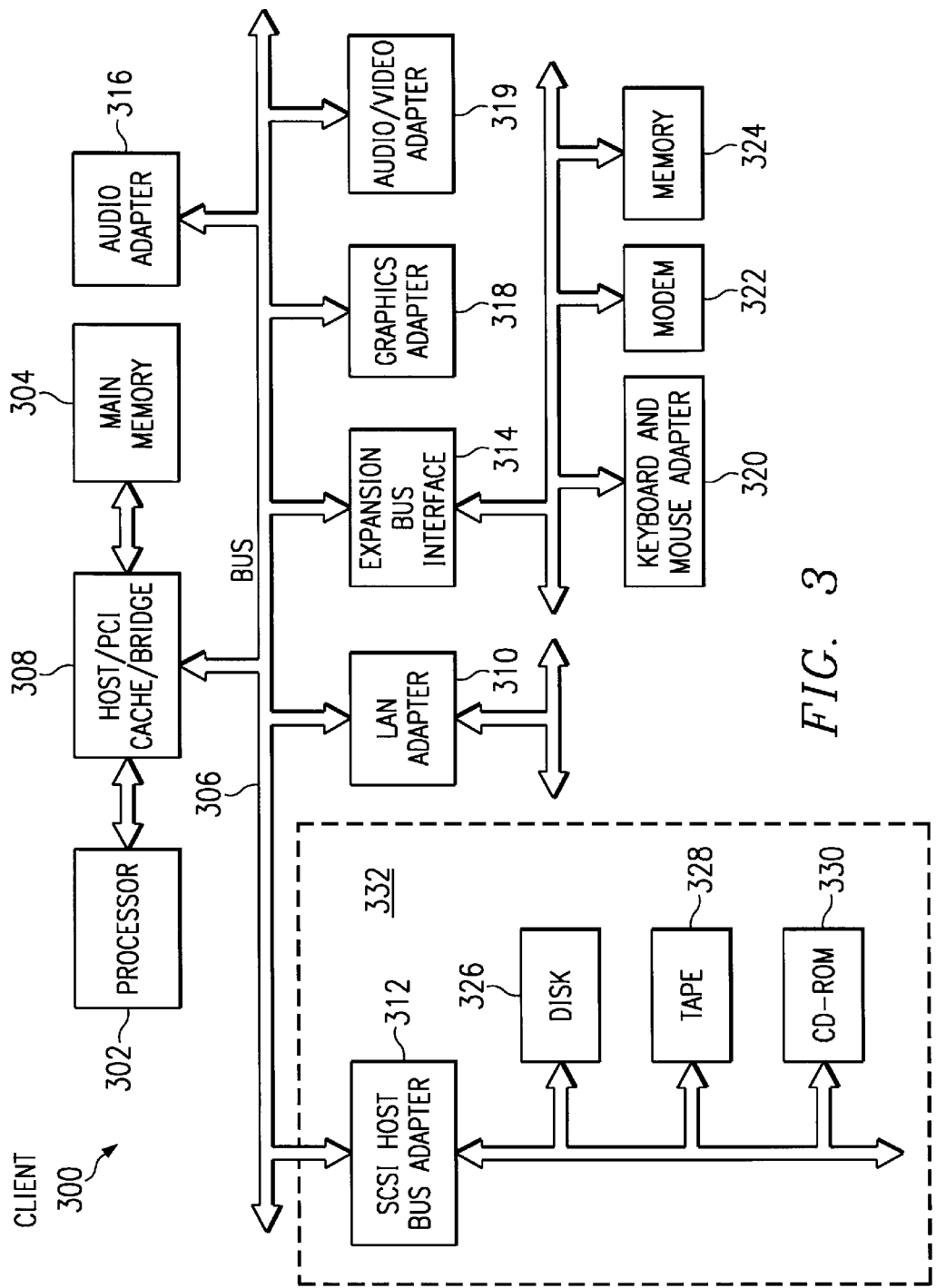
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and instructions for managing changes to data items at a number of clients from a server. These data items may be, for example, contained in data records, files, or other types of data structures.

A version number for a data item is stored in or in association with the data item by a server. These data items are distributed to clients. Each time a value or content of a data item changes, the version number also is changed. The version number also may be explicitly set at the server without a change in the value or content of a data item. Each client includes a mechanism for identifying data items to be change-controlled. For change-controlled items, the version number for the received data item is compared to the most recently recorded version number for the specific data item. If the version numbers differ, the received data item value or content is used to overwrite the current value or content for the corresponding data item.

Figure 4:
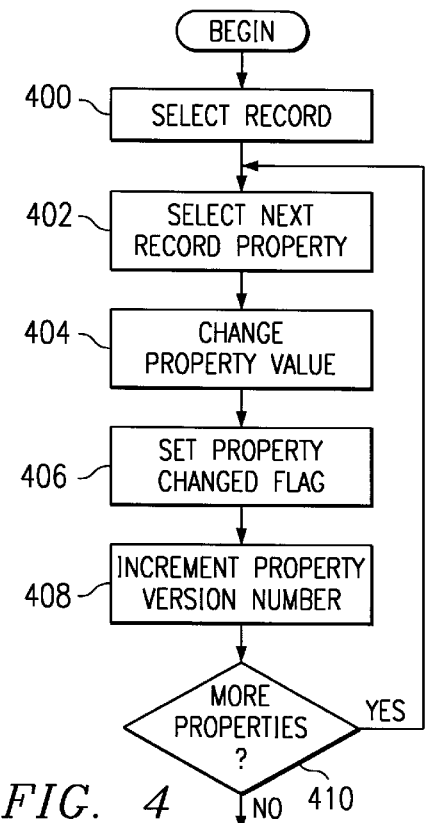
FIG. 4 is a flowchart of a process used by a server to change profile records depicted in accordance with a preferred embodiment of the present invention.

With reference now to FIG. 4, a flowchart of a process used by a server to change profile records is depicted in accordance with a preferred embodiment of the present invention. The process begins by selecting and obtaining a profile record with one or more properties that will be changed according to a list of settings received by the server (step 400). From the selected profile record, the server selects a profile property that will be changed (step 402). The server sets the profile property to the indicated value from the list (step 404) and then sets the property's change flag (step 406). The server then increments the profile property's version number (step 408). After this, the server determines whether there are more properties to be changed (step 410). If no more properties are present, the processing of the profile record change terminates. Otherwise, the process returns to step 402 to select the next property.

Figure 5:
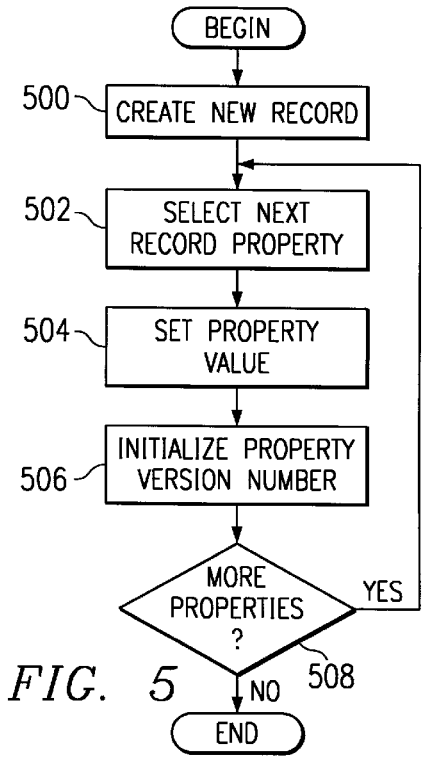
FIG. 5 is a flowchart of a process used by a server to create new profile records depicted in accordance with a preferred embodiment of the present invention.

With reference now to FIG. 5, a flowchart of a process used by a server to create new profile records is depicted in accordance with a preferred embodiment of the present invention. The process begins with the server creating a new, empty profile record (step 500). The server then selects a profile property that must be initialized in the new record (step 502). The server sets the profile property as indicated either by explicit user instructions or from a default value (step 504). Next, the property's version number is initialized to the special "cold" version value (step 506), indicating that the property is present in the created record but has not been updated. After this, the server determines whether there are more properties yet to be initialized (in step 508). Otherwise, the process returns to step 502 as described above.

Figure 6:
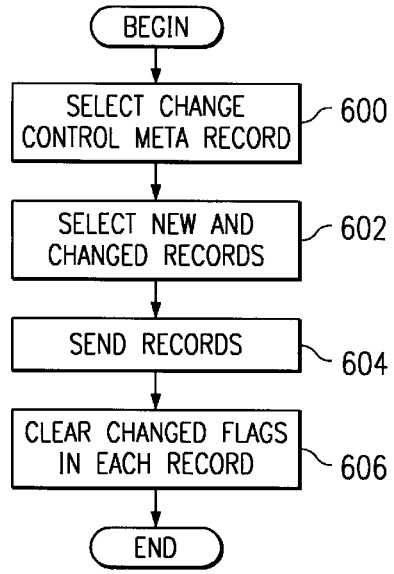
FIG. 6 is a flowchart of a process used by a server to distribute changes to clients depicted in accordance with a preferred embodiment of the present invention.

With reference now to FIG. 6, a flowchart of a process used by a server to distribute changes to clients is depicted in accordance with a preferred embodiment of the present invention. This processing begins with the server selecting the records that will be sent to the clients. The change-control meta-record is selected (step 600), and any profile records that have been added or changed since the last distribution from this profile are selected (step 602). Next, the server sends the records to a provided list of clients (step 604). In this example, the server does not keep track of which clients have received the records it distributes. After the records have been sent, the server clears the change flag in every property in every profile record that has just been distributed (step 606) and then terminates processing of the distribution.

Figure 7:
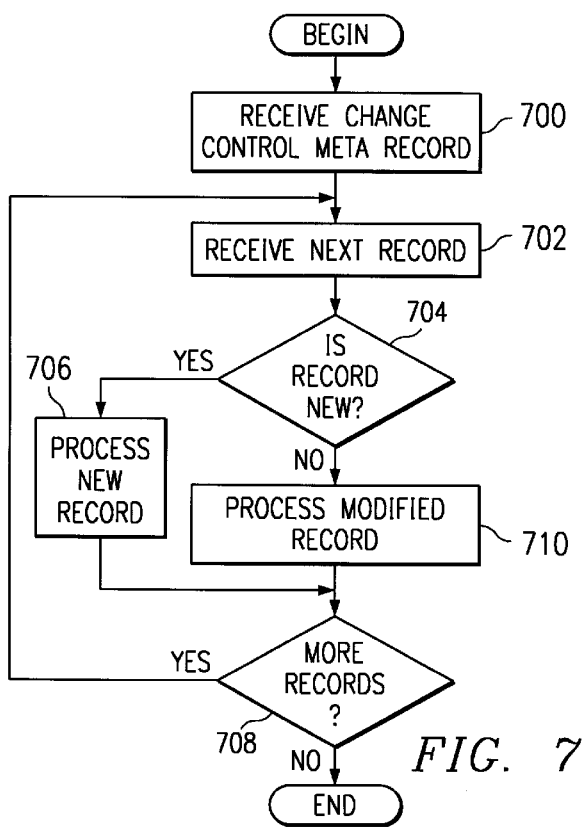
FIG. 7 is a flowchart of a process used by a client to update values for data items depicted in accordance with a preferred embodiment of the present invention.

With reference now to FIG. 7, a flowchart of a process used by a client to update values for data items is depicted in accordance with a preferred embodiment of the present invention. This processing begins when the client receives and parses the change-control meta-record (step 700). The meta-record is always the first record received, and its contents are converted to a list describing which profile properties are change-controlled in this distribution. After this, the client selects one of the profile records it has received (step 702) and determines whether the profile record was marked by the server as being new (step 704). If the record is new, the client performs new record processing (step 706). Step 706 is described in more detail in FIG. 9 below. If the record is not new, the client performs modified record processing (step 710). Step 710 is described in more detail in FIG. 8 below. When finished with the current record, the client determines whether other unprocessed records are present (step 708). If no more records are present, the processing of received profile records terminates.

Figure 8:
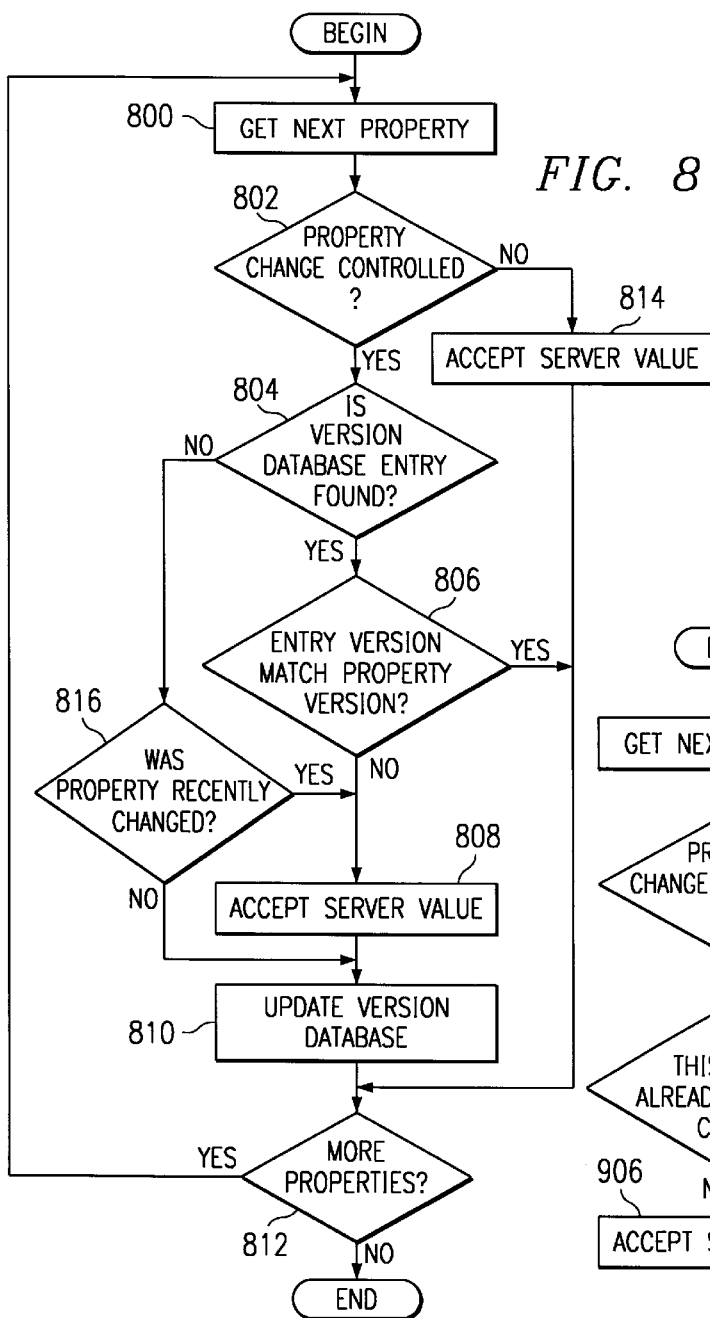
FIG. 8 is a flowchart of a process used by a client to update values for data items by using modified profile records depicted in accordance with a preferred embodiment of the present invention.

With reference now to FIG. 8, a flowchart of a process used by a client to update values for data items by using modified profile records is depicted in accordance with a preferred embodiment of the present invention. The client selects one of the properties contained in the modified profile record (step 800) and determines whether the property is change-controlled (step 802). If the property is change-controlled, the client then determines whether a version database entry exists corresponding to this property (step 804). If the version database entry is found, the client compares the entry's version number with the version number of the profile property (step 806). If the versions match, then the client ignores the value from the profile property and proceeds to step 812 to determine whether this record contains more unprocessed properties. Otherwise, if the versions do not match, the client accepts the server value for the property (step 808) and updates the version database with the value and version number from the property (step 810).

Returning to step 802, if the property is not to be change-controlled, then the client accepts the server value (step 814) but declines to update its version database and proceeds to step 812 to determine whether this record contains more unprocessed properties.

Returning to step 804, if no version database entry corresponds to this profile property, then the client tests the property's change flag (step 816). If the change flag is set, then the property has been recently changed, so the client accepts the property's value (step 808) and updates its version database (step 810). Otherwise, if the change flag is clear, the client will ignore the property's value, but will update its version database (step 810) for future reference. At this point, the client determines whether this record contains more unprocessed properties (step 812). If no more unprocessed properties are present, the client terminates processing of this profile record. Otherwise, the process returns to step 800.

Figure 9:
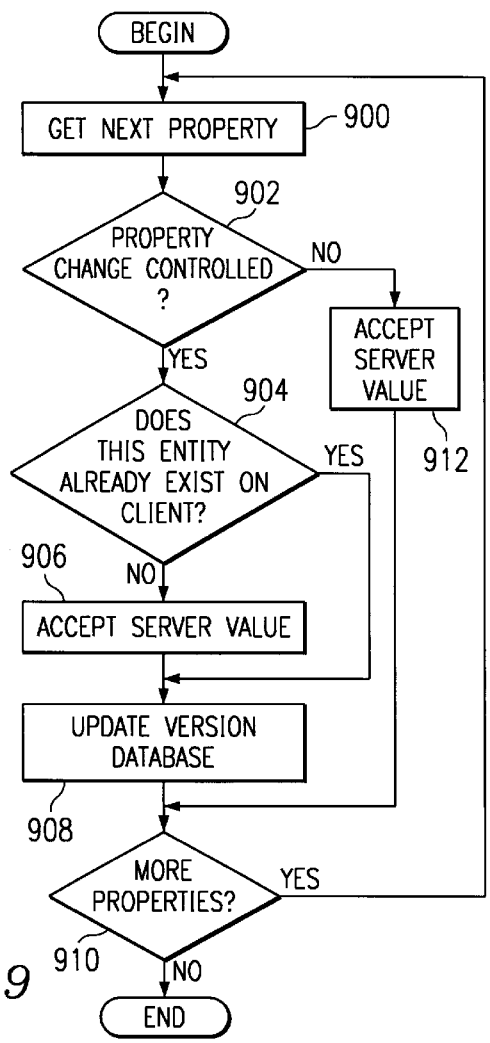
FIG. 9 is a flowchart of a process used by a client to update values for data items by using new profile records depicted in accordance with a preferred embodiment of the present invention.

With reference now to FIG. 9, a flowchart of a process used by a client to update values for data items by using new profile records is depicted in accordance with a preferred embodiment of the present invention. The client selects one of the properties contained in the new profile record (step 900) and determines whether the property is change-controlled (step 902). If the property is change-controlled, then the client determines whether the entity represented by the new profile record already exists on the client (step 904). An example of this situation would occur when a new profile record representing a client user account is discovered to have a login that matches an account that already exists in the client's system file.

If the profile record does not correspond to an existing client entity, then the client accepts the property's value (step 906) and updates its version database (step 908). If the client entity does already exist, then the processing ignores the property's value but still updates the version database (step 908). Next, a determination is then made as to whether more properties are present for processing (step 910). If more properties are present, the process returns to step 900. Otherwise, the process terminates.

Returning to step 902, if the new profile record property is not change-controlled, then the client accepts the property's value (step 912) without updating the version database. Following this, the process proceeds to step 910 and if the record contains no more unprocessed properties, then the client terminates processing of this profile record.

Figure 10A:
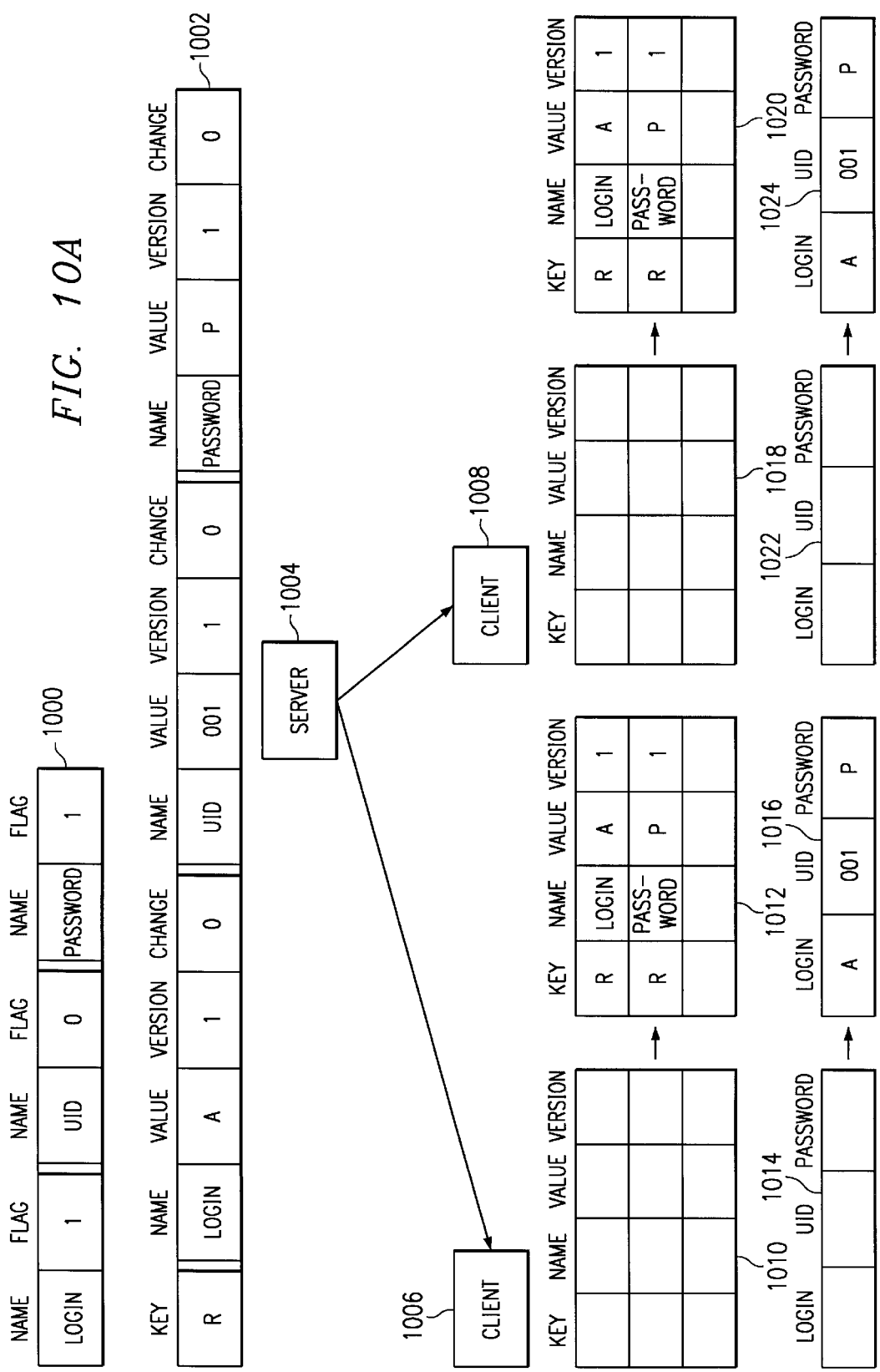
Figure 10C:
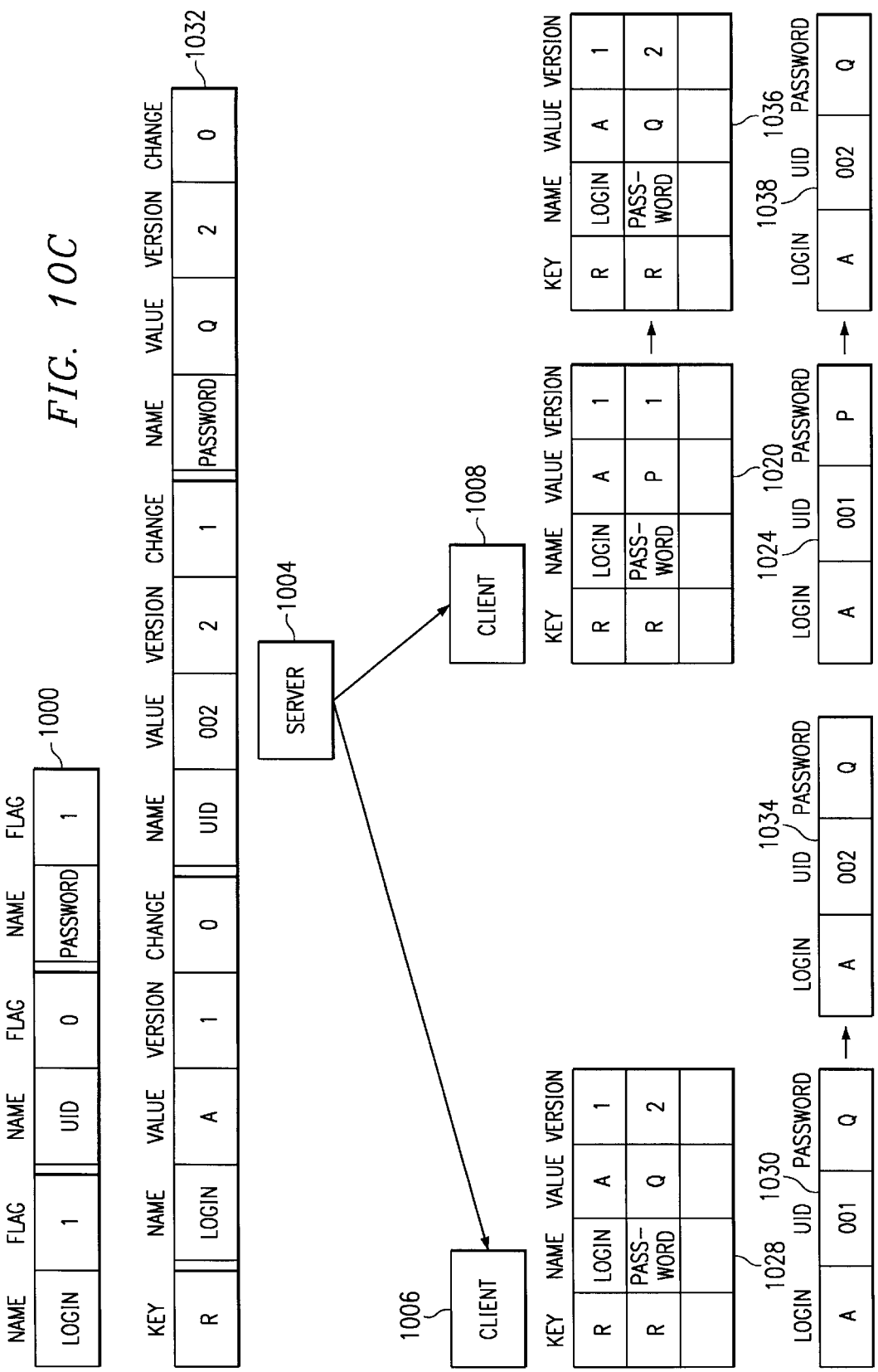

Turning next to FIGS. 10A–10C, diagrams for updating a password change are depicted in accordance with a preferred embodiment of the present invention. This example illustrates how the mechanism of the present invention uses version numbers to manage changes to passwords.

In FIG. 10A, record 1002 is created and sent along with the change-control meta-record 1000 from a server 1004 to clients 1006 and 1008. These clients are also referred to as "end points". The change-control meta-record 1000 indicates that two profile properties are currently change-controlled: login and password. Because the change-control flag is not set for UID in the meta-record, UID is not currently change-controlled.

Record 1002 in this example is a data structure containing a profile record key ("R") and three profile properties, each described by name, value, version, and change flag. In record 1002, the login property has a value A, the user ID ("UID") has the value 001, and the password property has the value P. The version numbers for all profile properties, whether change-controlled or not, begin at the special "cold" value; therefore, all three of these properties are shown beginning with a version number of 1. The change flags in record 1002 indicate whether a property has been changed since last distribution of the record; in this figure, the change flag for each property is set to 0 since record 1002 is newly created.

Both clients 1006 and 1008 first receive the meta-record 1000, then record 1002. Client 1006 interprets the meta-record and stores an internal list of change-controlled properties. As this client begins to create a local account corresponding to record 1002, it encounters the change-controlled login property and stores an entry in its version database to record the login's value and version number. Version database 1010 illustrates the contents before the distribution. Version database 1012 shows the contents after the entry is stored. This action is repeated when client 1006 encounters the password property, but no version database entry is created for UID because it is known not to be change-controlled. The client accepts the server's value for login and password because record 1002 is new, and accepts the server's value for UID because this property is not change-controlled. When the client has completed processing the data contained in record 1002, it writes the new account record into its system file. Record 1014 shows contents before the distribution and record 1016 illustrates contents after the data is written. The analogous steps are performed by client 1008.

In FIG. 10B, the password has been changed from P to Q with this new password being distributed to client 1006 and 1008 in record 1026. A version number for the password has changed from 1 to 2, and the change flag for this property is now set to 1. The change control meta-record 1000 is unchanged. In this example, the meta-record and new password are not received by client 1008. Client 1006 determines from the meta-record that login and password are change-controlled. When processing the login from record 1026, the client checks its version database 1012 for an entry describing the login for record key "R". Finding the entry, the client compares the version number contained by the version database entry with the version number in the login property of record 1026; since they are both 1, the client recognizes that it already has the latest version of this property, so ignores the login value presented by record 1026. However, in processing the password, the client discovers that record 1026 has a newer password than the client has seen before for record key "R" since the incoming version (2) does not match the number stored in its version database 1012 (1). The client therefore replaces the account's current password with the value offered by record 1026, a change that is reflected when the account is written back to the client's system file. Entry 1016 shows content before changes to the system while entry 1030 depicts contents after the distribution. At the time the client decides to accept the server's version of the password, it also updates the corresponding entry in its version database. Version database 1012 shows contents before the update and version database 1028 shows contents after the update with the new password value and version number.

The version database 1020 for client 1008 still has version number 1 along with the old value for the password because record 1026 was not received. As a result, the system file entry 1030 for client 1006 has the new password Q while the system file entry 1024 for client 1008 still contains the password P.

In FIG. 10C, the user ID is a non-change-controlled data item that has its value changed from 001 to 002 as shown in record 1032. In this case, the meta-record 1000 and record 1032 are received by both clients 1006 and 1008. Client 1006 will update the user ID (as shown in system file 1034) because the property is not change-controlled, and such properties are always overwritten by the server's values. This client checks its version database for the change-controlled login and password properties it finds in record 1032, but discovers that its local versions for record key "R" are current, so ignores the server's values and leaves its version database unchanged.

Client 1008 compares the login and password version numbers in record 1032 with those stored in its version database 1020. This client finds that its version of the password property is out of date, so it accepts the server's password value and updates its version database entry (reflected in version database 1036). As can be seen, the password is updated even though the original password change was missed by client 1008. This client also updates the user ID property because it is not change-controlled. The resulting changes to the system file on client 1008 are shown by entry 1038 in the system file.

Figure 11A:
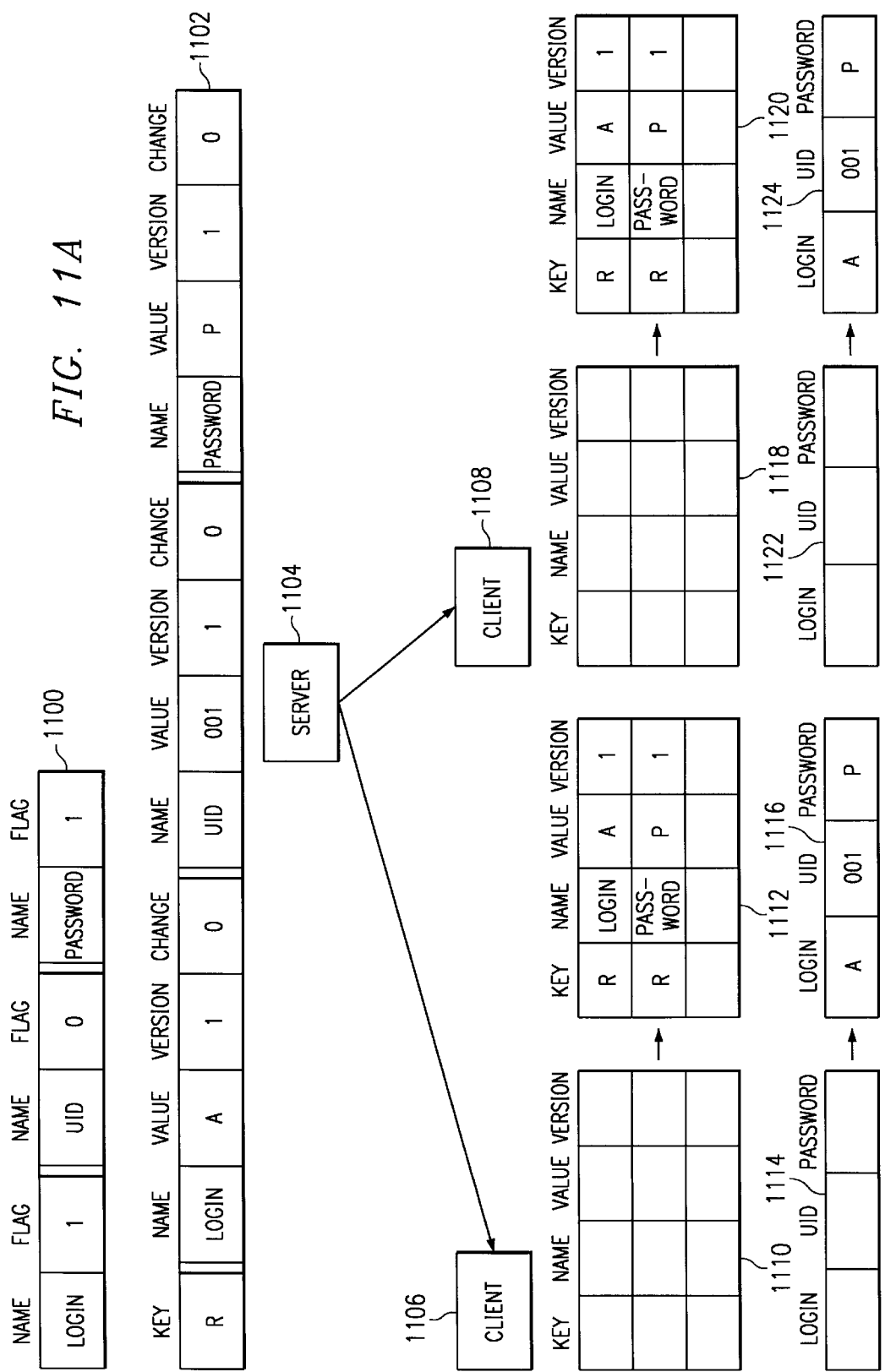
FIGS. 11A–11C are diagrams for a login change depicted in accordance with a preferred embodiment of the present invention.
Figure 11B:
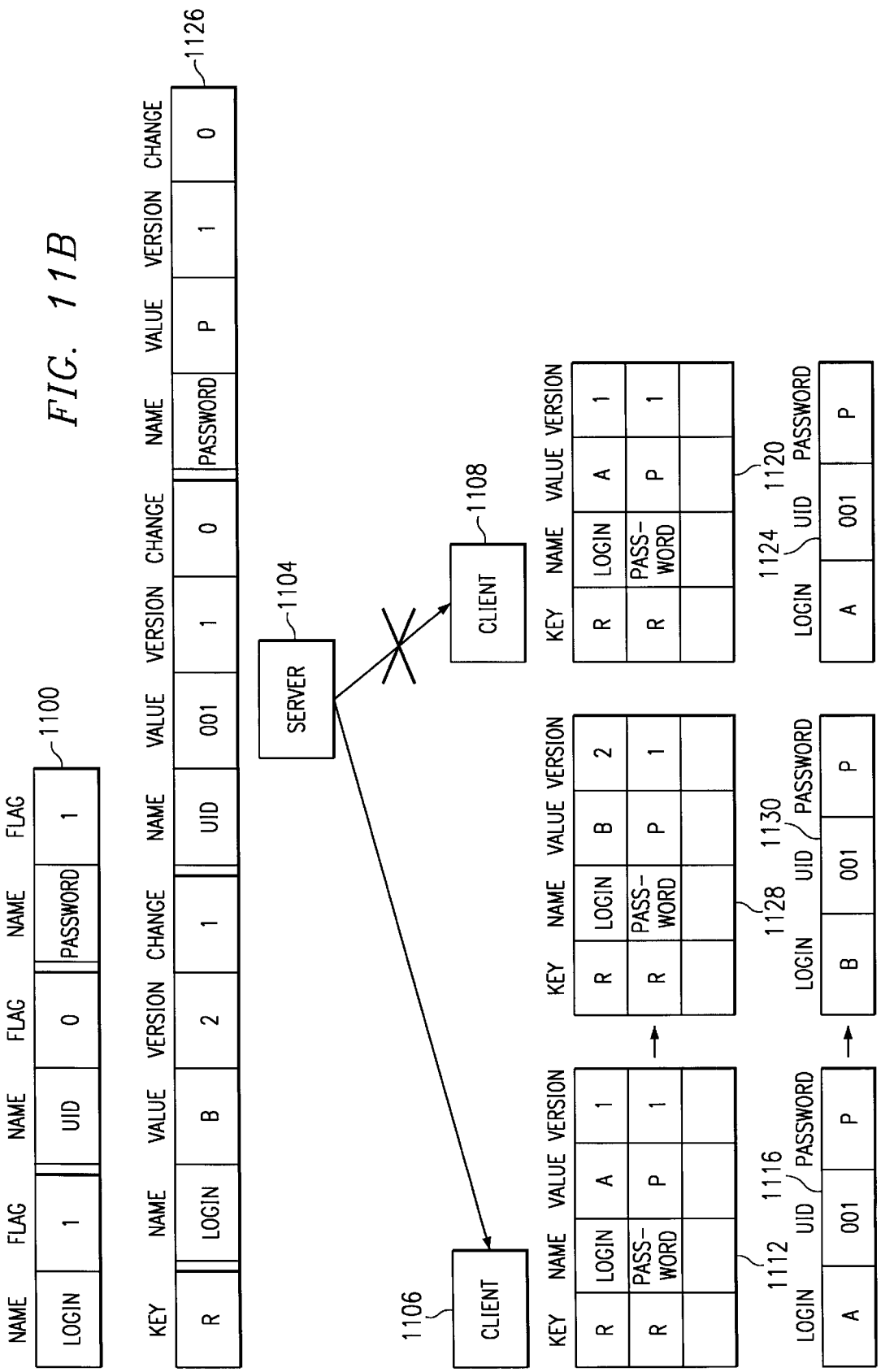
Figure 11C:
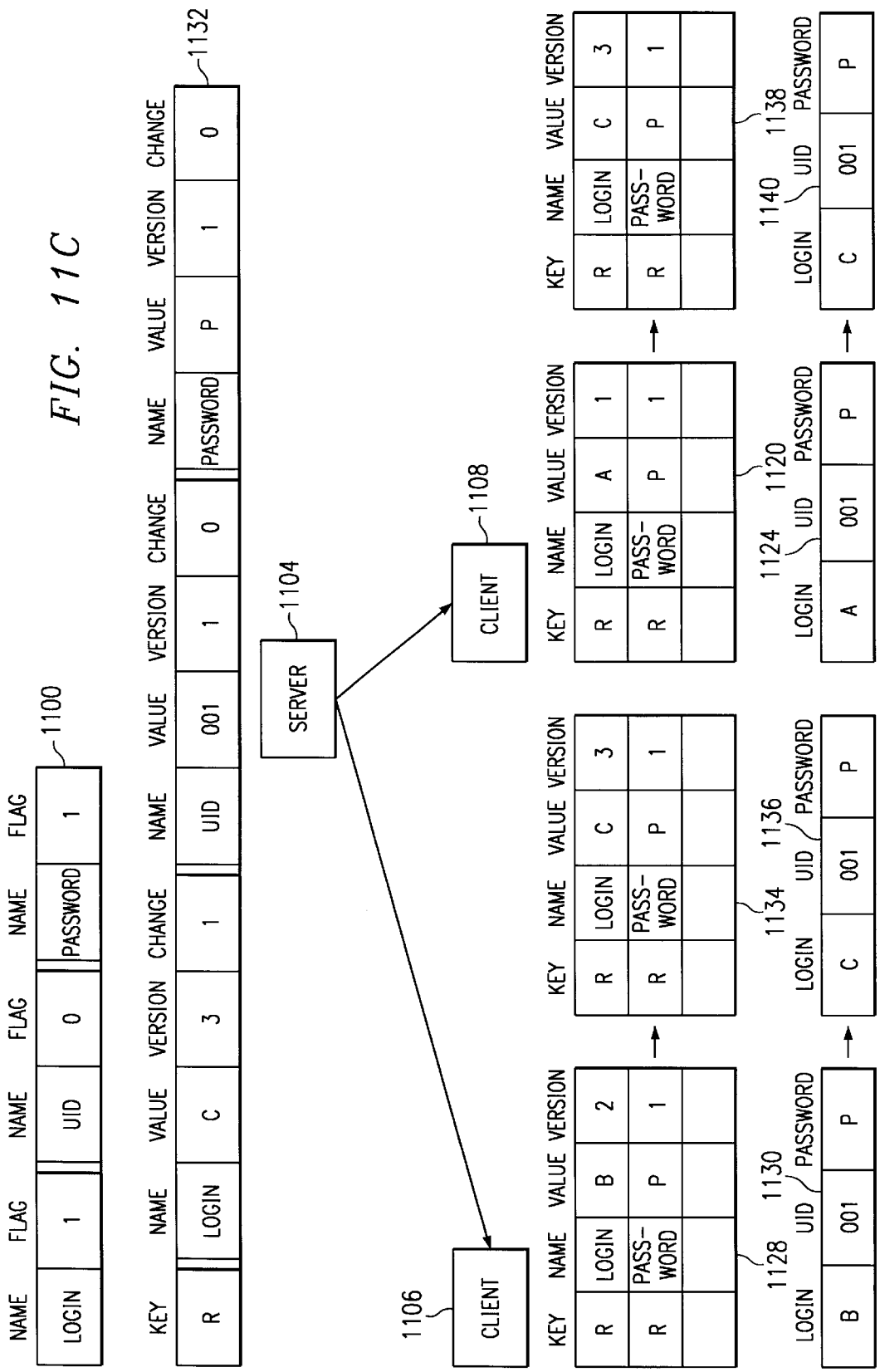

With reference now to FIGS. 11A–11C, diagrams for a login change are depicted in accordance with a preferred embodiment of the present invention. This example illustrates how the mechanism of the present invention uses version numbers to manage changes to logins. In FIG. 11A, a record 1102 is a data structure created having a record key "R" and three profile properties: a login property with value A, version 1, and change flag 0; a UID property with value 001, version 1, and change flag 0; and a password property with value P, version 1, and change flag 0. Change control meta-record 1100 contains change control information for the same three properties, and indicates that login and password are change-controlled while UID is not.

Server 1104 is used to distribute meta-record 1100 and record 1102 to clients 1106 and 1108. Upon receiving record 1102, client 1106 will create entries in its version database. Version database 1110 shows content before entries are created and version database 1112 depicts the content after entries are created, describing the key, name, version, and value of the record 1102's change-controlled properties. The client accepts the server's value for login and password because record 1102 is new, and accepts the server's value for UID because this property is not change-controlled. The resulting changes to the system file on client 1106 are shown in entry 1116. Client 1108 follows analogous steps. At the conclusion of the distribution, both clients 1106 and 1108 have new accounts with login A, UID 001, and password P, and have version database entries that associate the login property for record R with value A and version 1 and the password property for record R with value P and version 1.

In FIG. 11B, the login has changed from A to B with a corresponding change in the version number from 1 to 2 and the change flag from 0 to 1, as can be seen in record 1126. Meta-record 1100 and record 1126 are received by client 1106 but not by client 1108 in this example. Client 1106 will compare the version numbers of the change-controlled properties in record 1126 with the version numbers stored in its version database 1112. The login will be updated from A to B at client 1106 because the version numbers are different. Before updating the version database entry for the record with key R and property "login", client 1106 notes login value A as the name of a system entry that will be renamed to B. The updated version database is shown in version database 1128.

At the conclusion of this distribution, client 1106 modifies its system entry having login A to have login B, as shown in entry 1130, and has associated version number 2 with this login value. The login is not changed at client 1108 because record 1126 is not received by client 1108. The version database 1120 for client 1108 still associates the login property for record R with value A and version 1, and the system file entry 1124 still reflects login A.

In FIG. 1C, the login is changed from B to C and placed in record 1132. In addition, the version number is incremented to 3 and the change flag is set to 1. Meta-record 1100 and record 1132 are then sent by server 1104 to clients 1106 and 1108. After comparing the version numbers for the change-controlled properties in record 1132 with the version numbers stored in version database 1128 for the login and password, client 1106 will change the login from B to C, noting login B as an entry to be renamed later, and will then update the version database with the new login value and version number, as shown in version database 1134. At the conclusion of the distribution, client 1106 updates its system file by renaming the entry with login B to have login C, as shown in 1136. Client 1108 compares the change-controlled version numbers from record 1132 with the version numbers it finds in its version database 1120, and discovers that its login for the record with key R is out of date. Noting login A for subsequent renaming in the system file, client 1108 updates its version database to have value C and version 3 for the record with key R and property "login" as shown in version database 1138.

When rewriting its system file, this client renames login A to have login C, as shown in entry 1140. In this case, the update will be made even though client 1108 missed a previous update to the login. At this point in time, both clients 1106 and 1108 will have a login C and an associated version number 3.

With reference now to FIGS. 12A–12D, diagrams for a user ID change are depicted in accordance with a preferred embodiment of the present invention. This example illustrates how the mechanism of the present invention uses version numbers and settings in the change-control metarecord to manage changes to user IDs.

Figure 12A:
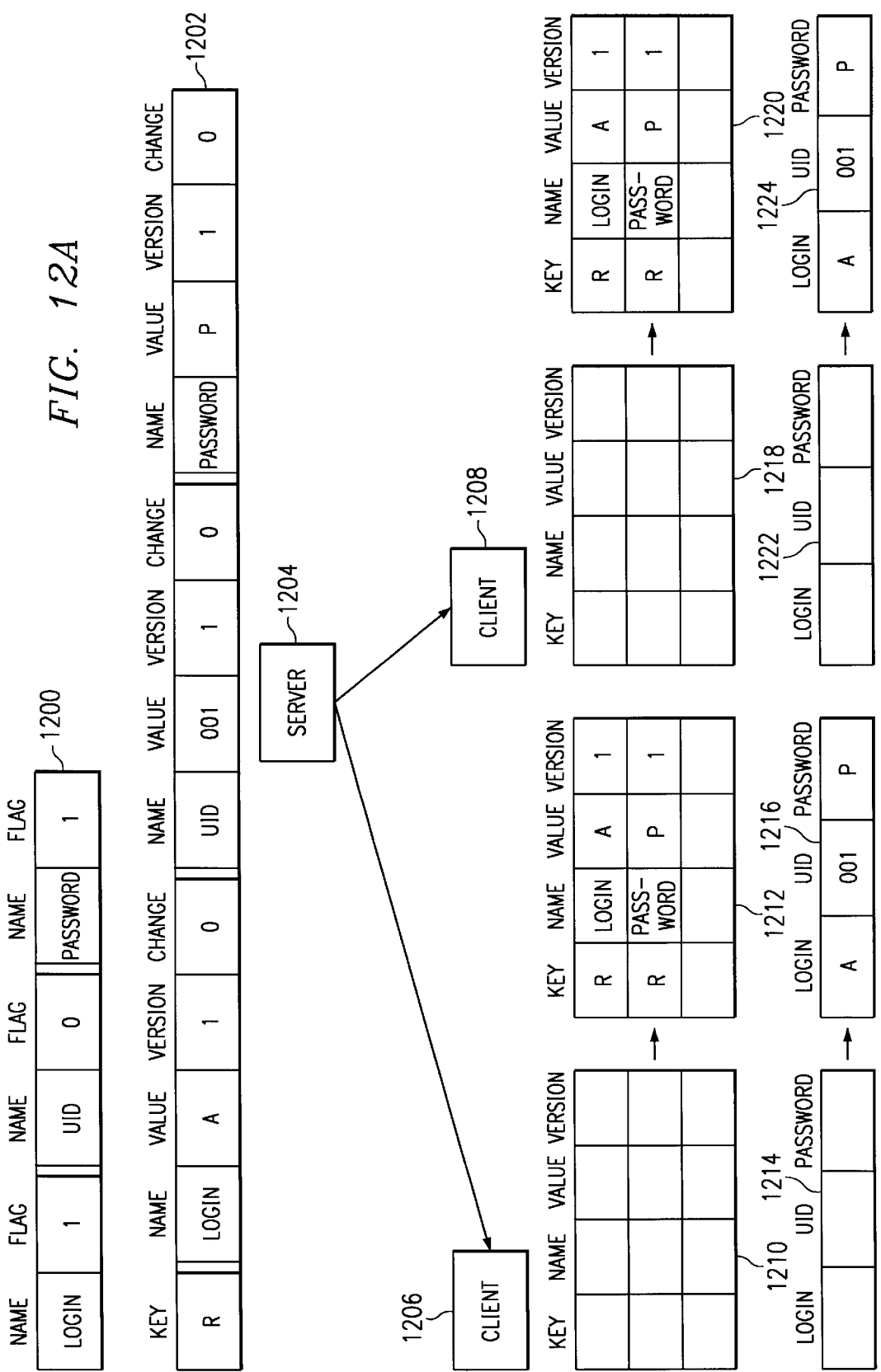

In FIG. 12A, a record 1202 is a data structure created having a record key "R" and three profile properties: a login property with value A, version 1, and change flag 0; a UID property with value 001, version 1, and change flag 0; and a password property with value P, version 1, and change flag 0. Change control meta-record 1200 contains change control information for the same three properties, and indicates that login and password are change-controlled, while UID is not. This initial setting for UID's flag in the meta-record is what a customer or user will choose if they prefer to have uniform UIDs maintained across their distribution endpoints since, with a 0 flag in the change-control meta-record, the server's UID will always overwrite the client's in a distribution.

Server 1204 is used to distribute meta-record 1200 and record 1202 to clients 1206 and 1208. Upon receiving record 1202, client 1206 will create entries in its version database. Version database 1210 shows content before creation of entries while version database 1212 illustrates content after creation of the entries. describing the key, name, version, and value of the record 1202's change-controlled properties. The client accepts the server's value for login and password because record 1202 is new, and accepts the server's value for UID because this property is not change-controlled.

The resulting changes to the system file on client 1206 are shown in entry 1216. Client 1208 follows analogous steps. At the conclusion of the distribution, both clients 1206 and 1208 have new accounts with login A, UID 001, and password P, and have version database entries that associate the login property for record R with value A and version 1 and the password property for record R with value P and version 1.

In FIG. 12B, client 1208 makes a local change to its system file 1224, changing the UID for login A from 001 to 200. The changed system file is shown as entry 1226. This change is not advertised to server 1204 or client 1206 in any way. The two clients now have system file entries for login A that differ in their UID values.

Figure 12C:
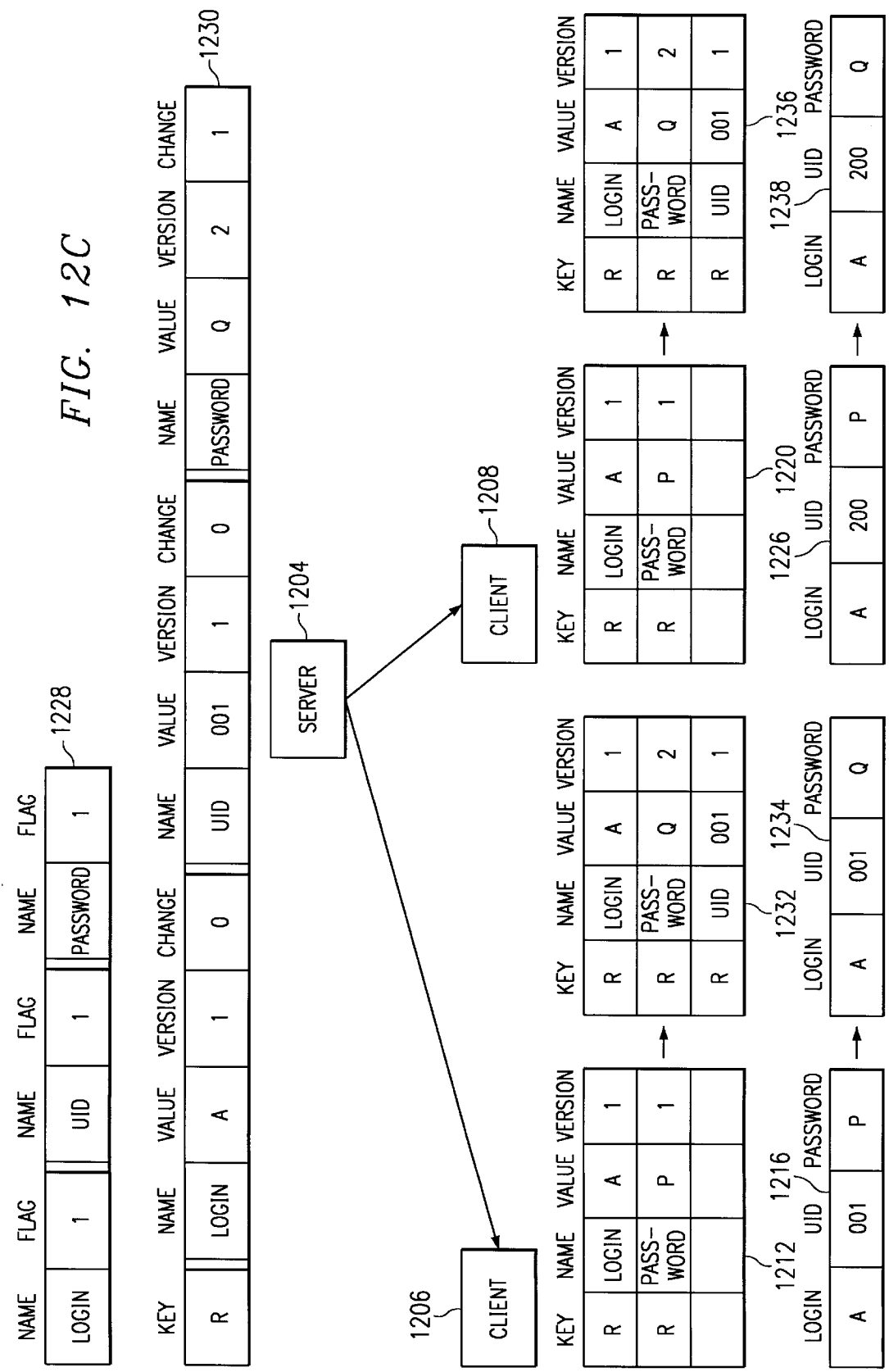

In FIG. 12C, server 1204 changes the change-control flag in meta-record 1228 for UID from 0 to 1, enabling change control for this property. In record 1230, the UID property has a version of 1. In these examples, enabling UID as change-controlled does not affect the version number of UID in any respect other than causing the version to be closely examined in later processing. The value of UID is unchanged from 001, so its change flag is still 0. Also in record 1230, the password property has been changed from value P to Q, so its version number has been incremented to 2 and its change flag is set to 1. Server 1204 is then used to distribute meta-record 1228 and record 1230 to clients 1206 and 1208.

When client 1206 receives these records, it checks its version database 1212 for version information on login, password, and UID, since all are change-controlled. The client finds that the incoming version of login for record key R is no different from the last distributed version so the client ignores the server's login value. The client finds that its version of password for record key R is out of date, so accepts the server's value Q and updates the version database. The client does not find a version database entry for the record with property "UID", since it has just been enabled as change-controlled, so it checks UID's change flag in record 1230. Seeing that the change flag is 0, the client determines that this is not a new UID value and ignores the server's value, but adds a version database entry to store the UID information for record key R.

The changes to the version database are shown in version database 1232 and the changes to the system file for client 1206 are shown in entry 1234. Client 1208 goes through the analogous steps, ignoring the server's login value and accepting the new password value. Client 1208 also fails to find a UID entry for record key R in its version database, so inspects the change flag for the UID property in record 1230; finding it to be 0, the client ignores the server's value. Significantly, this preserves client 1208's setting for the UID of login A, despite the fact that record 1230 contains a different value for UID; the updated system entry 1238 shows that, while the password was changed to Q, the UID 200 was left unchanged. The two clients still have accounts with login A that have different UID values.

Figure 12D:
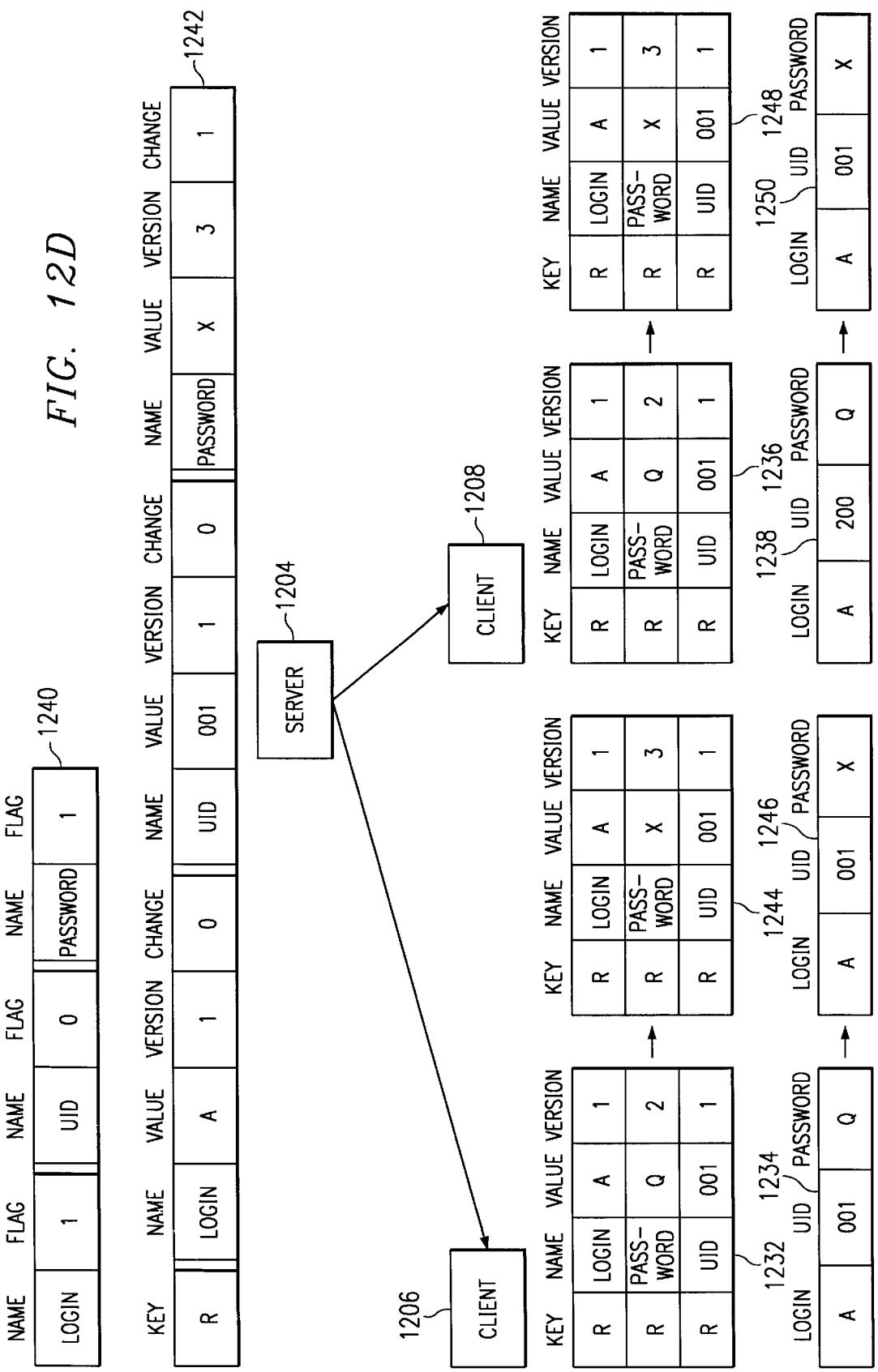

In FIG. 12D, the change-control meta-record 1240 has been changed to now have a 0 flag for the UID property. In other words, change control has been disabled for the UID property. In addition, record 1242 shows that the password property has been updated from value Q to value X, and its version has been incremented to 3 and its change flag is set to 1. Disabling change control for UID did not change its version number in record 1242.

Server 1204 distributes meta-record 1240 and record 1242 to clients 1206 and 1208. Client 1206 checks its version database 1232 for information on the two change-controlled properties received in the distribution. Client 1206 finds login up to date and password out of date for record key R. As a result, client 1206 accepts the new password value and updates the version database as shown in version database 1244. Though the entry for the UID property of record key R remains in the version database, the entry is no longer referenced since UID is no longer change-controlled. The client accepts the server's value for UID, which happens to be the same as the client's previous value for that account's UID.

When the distribution completes, client 1206 updates the system file entry for login A with an unchanged UID and a new password X, as shown in entry 1246. When client 1208 receives meta-record 1240 and record 1242, it also ignores the server's login value and accepts the server's password value, and because UID is no longer change-controlled, this client overwrites the account's current UID (200) with the server's value, 001.

Therefore, after the distribution completes on client 1208, the system entry for login A will reflect both a new password X and a changed UID, as shown by entry 1250. This example demonstrates that during the time that UID was change-controlled, the two clients were allowed to have different UIDs for their accounts with login A. After disabling change control for this property, the next distribution of the profile record synchronized the UIDs on both clients with the server's UID value for that account.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the data structure managed in the depicted examples are records containing values for data items, other types of data structures may be managed. For example, the data structure may be a file, such as a program file, associated with a version number. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for controlling distribution of data structures, the method comprising the data processing system implemented steps of:

receiving a data structure;

determining whether the data structure is change controlled;

responsive to a determination that the data structure is change controlled, identifying a version identifier for data within the data structure to form an identified version identifier;

comparing the identified version identifier with an existing version identifier for existing data corresponding to the data in the data structure; and responsive to a difference between the identified version identifier and the existing version identifier, replacing the existing data with the data in the data structure.

2. The method of claim 1 further comprising:

responsive to an absence of a determination that the data structure is change controlled, replacing existing data corresponding to data in the data structure with the data in the data structure.

3. The method of claim 1, wherein the data structure contains a password.

4. The method of claim 1, wherein the data structure includes the version identifier.

5. The method of claim 1, wherein the data structure is a first data structure and the version identifier is received in a second data structure.

6. The method of claim 1, wherein the data structure comprises a program file.

7. A method in a data processing system for managing distribution of data structures, the method comprising the data processing system implemented steps of:

storing a version number in association with a data structure at a server;

incrementing the version number in response to a change in the data structure;

distributing the data structure and the version number from the server to a plurality of clients;

responsive to receiving at a client within the plurality of clients the data structure and the version number for the data structure, determining whether a recorded version number for the data structure is present at the client;

responsive to determining that the recorded version number is present at the client, determining whether the recorded version number equals the version number; and responsive to an absence of a determination that, the recorded version number equals the version number, performing an update using the data structure.

8. The method of claim 7, wherein the data structure is a user identifier.

9. The method of claim 7, wherein the data structure is a password.

10. The method of claim 7, wherein the data structure is a configuration file.

11. The method of claim 7, wherein the data structure is a program file.

12. A data processing system for controlling distribution of data structures, the data processing system comprising:

receiving means for receiving a data structure;

determining means for determining whether the data structure is change controlled;

identifying means, responsive to a determination that the data structure is change controlled, for identifying a version identifier for data within the data structure to form an identified version identifier;

comparing means for comparing the identified version identifier with an existing version identifier for existing data corresponding to the data in the data structure; and replacing means, responsive to a difference between the identified version identifier and the existing version identifier, for replacing the existing data with the data in the data structure.

13. The data processing system of claim 12 further comprising:

replacing means, responsive to an absence of determination that the data structure is change controlled, for replacing existing data corresponding to data in the data structure with the data in the data structure.

14. The data processing system of claim 12, wherein the data structure contains a password.

15. The data processing system of claim 12, wherein the data structure includes the version identifier.

16. The data processing system of claim 12, wherein the data structure is a first data structure and the version identifier is received in a second data structure.

17. The data processing system of claim 12, wherein the data structure comprises a program file.

18. A data processing system for managing distribution of data structures, the data processing system comprising:

storing means for storing a version number in association with a data structure at a server;

incrementing means for incrementing the version number in response to a change in the data structure;

distributing means for distributing the data structure and the version number from the server to a plurality of clients;

second determining means, responsive to receiving at a client within the plurality of clients the data structure and the version number for the data structure, for determining whether a recorded version number for the data structure is present at the client;

third determining means, responsive to determining that the recorded version number is present at the client, for determining whether the recorded version number equals the version number; and replacing means, responsive to an absence of a determination that the recorded version number equals the version number, performing an update using the data structure.

19. The data processing system of claim 18, wherein the data structure is a user identifier.

20. The data processing system of claim 18, wherein the data structure is a password.

21. The data processing system of claim 18, wherein the data structure is a configuration file.

22. The data processing system of claim 18, wherein the data structure is a program file.

23. A computer program product in a computer readable medium for controlling distribution of data structures, the computer program product comprising:

first instructions for receiving a data structure;

second instructions for determining whether the data structure is change controlled;

third instructions, responsive to a determination that the data structure is change controlled, for identifying a version identifier for data within the data structure to form an identified version identifier;

fourth instructions for comparing the identified version identifier with an existing version identifier for existing data corresponding to the data in the data structure; and fifth instructions, responsive to a difference between the identified version identifier and the existing version identifier, for replacing the existing data with the data in the data structure.

24. A computer program product in a computer readable medium for managing distribution of data structures, the computer program product comprising:

first instructions for storing a version number in association with a data structure at a server;

second instructions for incrementing the version number in response to a change in the data structure;

third instructions for distributing the data structure and the version number from the server to a plurality of clients;

fourth instructions, responsive to receiving at a client within the plurality of clients the data structure and the version number for the data structure, for determining whether a recorded version number for the data structure is present at the client;

fifth instructions, responsive to determining that the recorded version number is present at the client, for determining whether the recorded version number equals the version number; and sixth instructions, responsive to an absence of a determination that the recorded version number equals the version number, for performing an update using the data structure.

* * * * *